J. A. OSBORN.
ELECTRIC WELDER.
APPLICATION FILED JUNE 17, 1913.
1,164,009.
Patented Dec. 14, 1915.
2 SHEETS—SHEET 1.
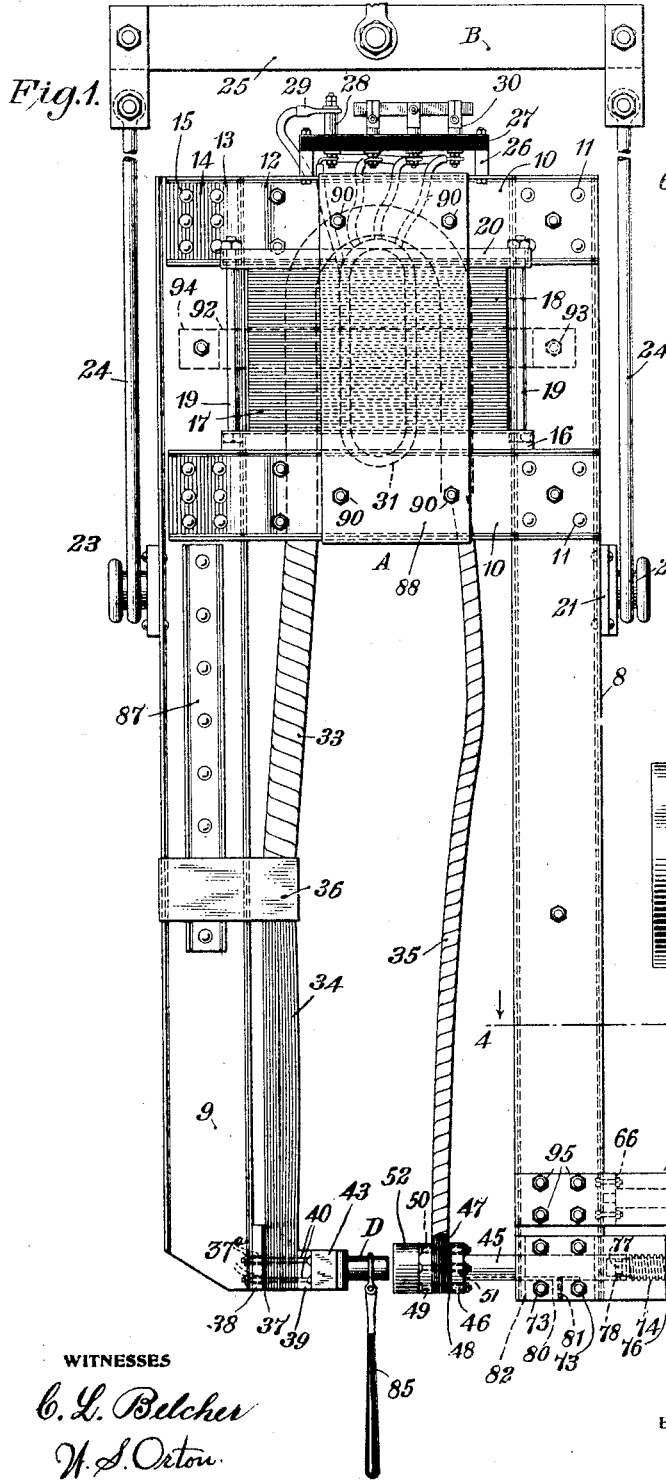
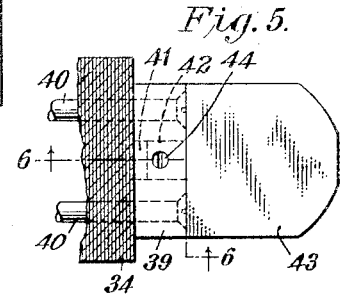
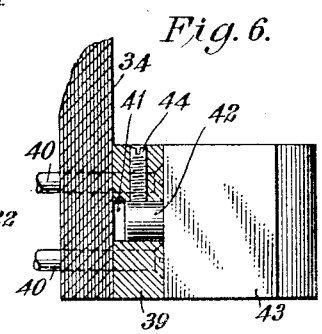
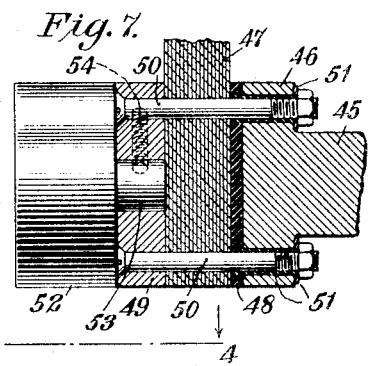
WITNESSES
C. L. Belcher
H. S. Orton
INVENTOR
Joseph A. Osborn
BY J. H. Gibbs
ATTORNEY

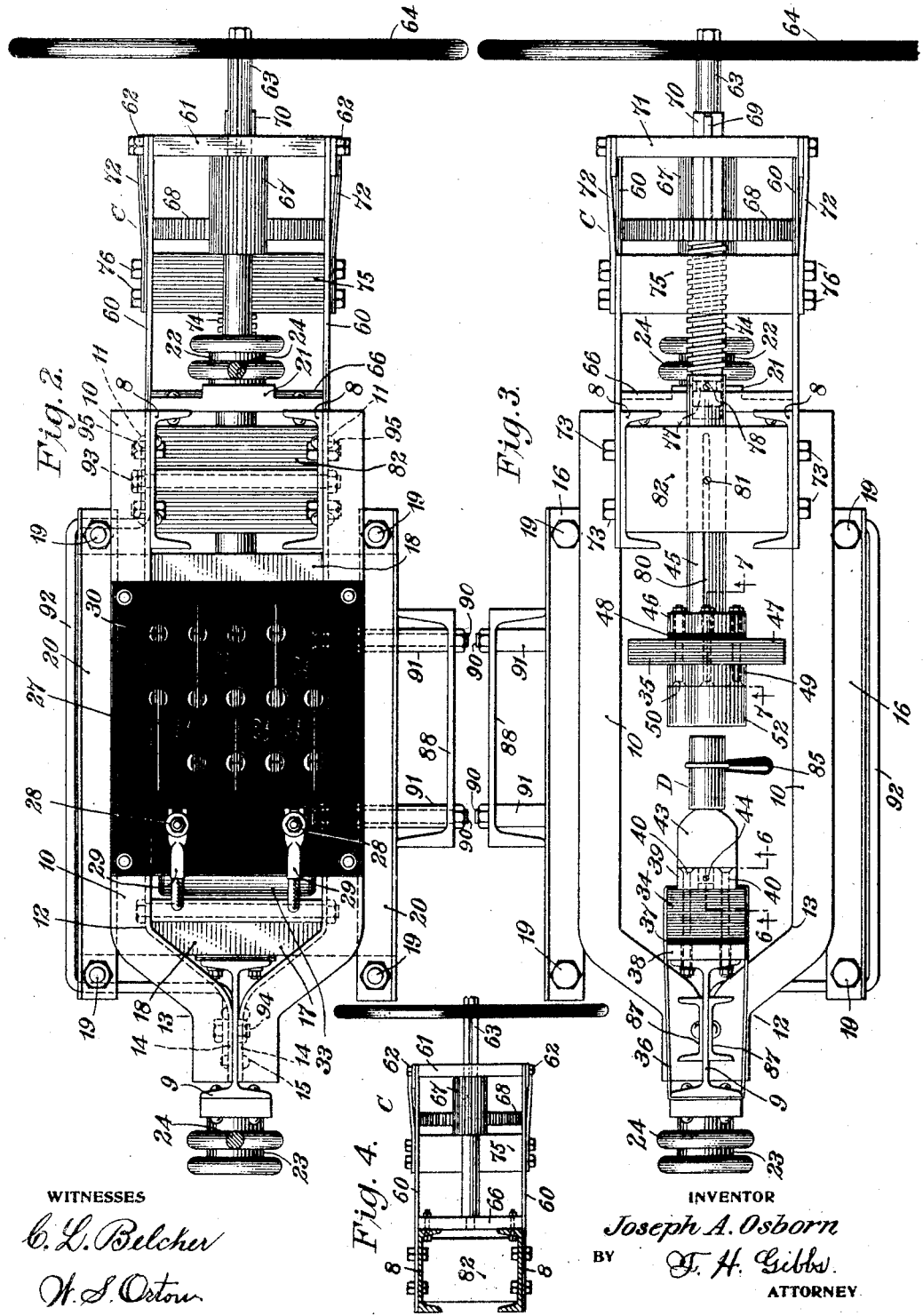

UNITED STATES PATENT OFFICE.

JOSEPH A. OSBORN, OF ST. LOUIS, MISSOURI.

ELECTRIC WELDER.

1,164,008.

Specification of Letters Patent.  Patented Dec. 14, 1915.

Application filed June 17, 1913. Serial No. 774,230.

*To all whom it may concern:*

Be it known that I, JOSEPH A. OSBORN, residing at St. Louis, Missouri, and being a citizen of the United States, have invented certain new and useful Improvements in Electric Welders, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a side elevation of a physical embodiment of my invention, the overhead suspending means being broken away. Fig. 2 is a plan view looking down on the device shown in Fig. 1, with portions of the supporting means broken away. Fig. 3 is a plan view of the bottom of the device shown in Figs. 1 and 2. Fig. 4 is a reduced horizontal transverse sectional view showing part of the actuating mechanism for the movable electrode, and taken on a plane indicated by the line 4—4 of Fig. 1, looking downward and in the direction indicated by the arrow. Fig. 5 is an enlarged plan view of the detachable positive electrode showing adjacent portions of the welder. Fig. 6 is a side elevation of the electrode shown in Fig. 5, showing the connection with the welder in section and on the line 6—6 of Figs. 3 and 5, and Fig. 7 is a side view of the negative electrode, showing the adjacent part of the welder in vertical section and on the line 7—7 of Fig. 3.

My invention relates to an electric welder particularly adapted for spot welding parts of cars, and an object of my invention is to provide in a device of the above identified character, a carriage reinforced to withstand the shocks and strains incidental to a device of this kind, which device may be readily transported from place to place by means of an overhang crane or track.

Another object of my invention is to provide a welder so constructed and arranged that the heating incidental to the welding operation shall be contained in a member which can be readily removed and a cold member quickly inserted in its place in making the next weld.

A still further object of my invention is to provide a means for rapidly moving one of the electrodes into engagement with the work, and for strongly compressing the work when the same has been subjected to the softening heat in the preliminary stage of the welding.

I attain the above outlined objects broadly by constructing a carriage A, including a vertically disposed structure of some material height trunnioned to an overhead bracket B, which in turn is supported by the crane or overhead track, not shown. Mounted upon and forming part of the frame A is the movable electrode actuating mechanism C, and adapted to be disposed between the electrodes is the separable heat-absorbing member D, all hereinafter more fully described.

Described more in detail, the carriage comprises essentially a pair of vertically extending, inwardly facing and spaced apart channel members 8, their flat faces facing outwardly and maintained in their spaced apart relation by means hereinafter more fully described. Paralleling the channels 8 and having its web disposed in a plane parallel to and intermediate the channels 8 is an I-beam 9. The upper portions of the channels and I-beam are connected by a pair of superposed vertically spaced apart yokes 10, each yoke formed of a pair of outwardly facing channel members, one end of each of which is fastened by means of the rivets 11 to the outer flat face of one of the channels 8 and each channel member 10 extends parallel to the said flat face for some distance and is bent at 12 and 13 to form a flat face 14, which flat face is fastened by means of rivets 15 to one face of the web of the I-beam 9. By this construction it will be seen that there is formed in effect a pair of horizontally disposed yokes in the form of Y's, the crotches or stems of which are formed by the I-beam 9 and the inside of the outer end of each of the superposed legs of the yokes is outlined by one of the channels 8.

Resting upon the lower of the yokes 10 is a pair of supporting angles 16, one resting upon each leg of the yoke and forming a support for the transformer 17, which transformer is disposed between the superposed yokes. The laminated core shell 18 is removable and held to the angle iron 16 by means of spaced bolts 19 fastened through opposite ends of the angle 16 and top bearing angle 20. Disposed slightly below the lower yoke 10 and connecting the outer flanges of the channels 8 is a trunnion block 21 carrying a trunnion 22, and correspondingly positioned on the outer flange of the I-beam 9 is a trunnion 23, the block 21 serving to brace the channels 8. Engaging each of the trunnions 22 and 23 is a vertically disposed supporting rod 24 attached to opposite ends of the head piece 25 constituting part of the bracket B. By this construction it will be noted that the heavy transformer is disposed above the pivoting line of the carriage, which pivoting line is disposed slightly above the center of gravity, thereby permitting an easy swinging of the carriage on its trunnions. Positioned above, supported from and extending parallel with the upper yoke 10 and spaced therefrom by the spacing members 26 is an insulating plate 27, extending through which plate and carried thereby are the binding posts 28, to which are attached the terminals 29 leading from which are conductors running to a suitable source of electric energy.

Insulating plate 27 is a switch board, and mounted thereupon is a series of electric switches, grouped and connected so that the entire primary winding 31 of the transformer may be energized, or more or less of it cut out by throwing certain switches to alter the connections to run to various taps in said primary winding. Thus, the induced current in the secondary winding and circuit may have a strength suited to the character of the work to be welded. The switch at each end of the group of switches is shown as a single pole, single throw, switch, and the intermediate switches are single pole, double throw, switches, and each switch comprises the requisite number of contacts 30 and a knife blade 32. Whatever switches are selected to be in service will be in circuit with a source of electrical energy, binding posts 28 and part or all, as required, of the primary winding 31.

Constituting the secondary of the transformer are the laminated copper plates 33 arranged as shown more particularly in Fig. 1, in the form of an inverted U, disposed in the crotch of which is the primary 31. The leg 34 is fixed relative to the welder by means of the strap 36 passing about the copper laminæ and about the I-beam 9 a short distance above the lower end of these copper strips. The portion of the leg 34 above the strap 36 and all but the terminal of leg 35 is wound with some suitable insulating material so as to prevent short circuiting. The terminal of the laminated leg 34 is insulated from the I-beam 9 by means of the insulating strip 37, forming a facing for the space block 38, insulating sleeves and washers, shown at 37ª, in Fig. 1, insulating bolts 40 from space block 38 and I-beam 9.

Positioned on the face of the inner strips 34 facing a cuboidal electrode 43 hereinafter described is a holding block 39, which block is fastened to the I-beam 9 by means of bolts 40 passing through the block, the leg 34, insulating strip 37, block 38, and bolted through the outstanding flanges to the I-beam 9. The holding block 39 has a centrally disposed aperture or recess 41 therein facing the said cuboidal electrode, adapted to be disposed in which recess 41 is the plug projecting from the center of the rear face of the cuboidal electrode 43, this electrode being removably held in place by means of the binding screw 44, which passes vertically through the block 39 to engage the plug 42. To form another electrode, 52, for the welder, the shaft 45, hereinafter more fully described, terminates in an enlarged head 46 facing the bare laminations 47, at the terminal of leg 35, and abutting the insulating plate 48, which is interposed between said terminal of leg 35 and head 46. Facing the laminations 47 on the side opposite the insulating plate 48 is a holding block 49, corresponding to the block 39, fastened to the head 46 by means of bolts 50, which pass through the block, laminations 47 and through the head 46, and is insulated from the head by means of the insulating sleeves and washers 51. The electrode 52 is in the form of a solid cylinder having a stud 53 projecting from its rear face and fitting a centrally disposed aperture in the block 49, the cylindrical electrode 52 being held in place by means of the binding screw 54 passing through the holding block 49 and engaging the stud 53. By this construction it will be noted that the electrodes are spaced a short distance from each other, and adapted to contain therebetween the work which is to be welded, as is usual with devices of this character, and it will be noted that the leg 35 is flexible so that it is free to swing with the electrode 52.

In order to feed the cylindrical electrode 52 to and from the cuboidal electrode 43, there is mounted upon and extending outwardly from the lower end of the channels 8 the bracket C, which bracket comprises pairs of outstanding plates 60 and 72, each plate 60 being riveted to the outer face of one of the channels by bolts 95, and connected at their outer end by means of a face plate 61 disposed therebetween and fastened thereto by means of the vertically spaced bolts 62, journaled within which plate is a shaft 63, the outer end of which has fixedly mounted thereon an insulated hand-wheel 64, the inner reduced end of which is journaled within the bearing plate 66, which bearing plate also performs the function of additionally maintaining the channels 8 in their spaced apart relation.

Rigidly mounted upon the shaft 63 and in rear of and abutting the face plate 61 is an elongated pinion 67, permanently in mesh with which pinion is a gear wheel 68, which gear wheel has a diameter materially greater than the diameter of the pinion 67 and is fastened by means of a spline 69 to a shaft 70, which shaft parallels the shaft 63, and has its outer end journaled in the face plate 71. Corresponding to and positioned below the face plate 61, the plate 71 is disposed between the outer ends of the side plates 72, the inner ends of which latter plates are fastened by means of the bolts 73 to the outer face of the channels 8 below the outstanding plates 60.

The shaft 70 from the gear 68 to adjacent its inner end is formed into square threads 74, threading through a screw block 75 positioned between the plates 72 and fastened thereto by means of bolts 76. The inner end of the shaft 70 has a peripheral groove 77 therein and is telescoped by the recessed outer end of the shaft 45, hereinbefore described. The shafts 45 and 70 are held in position rotatable relative to each other, but immovable longitudinally relative to each other by means of the pin 78 passing through the inner end of the shaft 45 into the groove 77. The shaft 45 has a longitudinally extending slot 80 in the underside thereof, which slot is engaged by the inner end of the set screw 81 inserted through the bottom of the block 82, which block is disposed between and helps to maintain the lower end of the channels 8 in their spaced apart relation.

It will be understood that rotating the hand-wheel 64 will in turn rotate the shaft 63, pinion 67, gear 68 feeding the shaft 70 through the screw block 75 advancing the shaft 70 transversely of the welder. This movement similarly advances the shaft 45 and attached cylindrical electrode 52 toward and from the cuboidal electrode 43.

It has been found in devices of this character that the electrodes rapidly become heated, so that it has been found necessary to provide cooling means, which cooling means are expensive, cumbersome and frequently inoperative, especially after the device has been in operation for several hours. With my form of welder I propose to position between the work and the cuboidal electrode 43 a readily removable member so that in the operation of welding, the removable member, when heated, may be dropped into a bucket of water and a new member inserted in its place, and for this purpose I have shown a member D, hereinbefore referred to as a heat-absorbing member, which may be in the form of a cylinder of metal manipulated by means of the insulated handle or tongs 85. It will be understood that this member merely abuts the outer face of the electrode 43 without being physically attached thereto.

It is to be understood in the operation of this device that the separable member D is placed in position abutting the electrode 43 and extending toward the electrode 52. The work to be welded is inserted between the removable member D and the electrode 52, and by means of the hand-wheel 64 the members are brought into firm physical and electric contact, when the current is turned on as is usual with devices of this character. After the desired softening of the metal or work the hand wheel 64 is given a further turn to positively unite and weld the work together, after which the hand-wheel may be re-rotated to separate the electrodes and the hot member D removed and a cold member D inserted in its place for the next weld. The cross sectional area of member D is less than that of either of the said electrodes. The resistance, therefore, is greater through members D and the work, producing a consequent maximum heat at the point of welding. So concentrating the heat in members D prolongs the life of the electrodes 43 and 52, for, as has been set forth, these members may be frequently removed to cool and others of the same type be substituted in the interim.

It has been found convenient to reinforce the carriage A in some instances, and for this purpose a channel member 87 is riveted to each face of the web of the I-beam 9, and for a similar reason the yoke members 10 are connected on one side by means of the channel 88, which channel abuts the angles 16 and 20 and is fastened to the yokes by means of the bolts 90, which bolts also carry the spacing sleeves 91 disposed between the webs of the juxtaposed channels of the upper and lower yoke members 10. Channel 88 is also provided to act as a position retainer for the transformer. Also tending to brace one of the channels 8 from the I-beam 9 and maintaining the transformer in position, is a substantially U-shaped metal strap 92, one outturned end of which is fastened by means of bolts 93 to the unflanged face of the channel 8 and the opposite outturned end is fastened by means of the bolt 94 to the web of the I-beam 9.

What I claim is:

1. In an electric welder, a fixed electrode, a co-acting electrode movable relative to said fixed electrode, a manually-controlled conductor adapted to be disposed between said electrodes electrically connected to one of said electrodes, said conductor being physically disconnected from the welder whereby said conductor when heated during the welding operation may be readily replaced by a cold conductor.

2. In an electric welder, a pair of horizontally disposed U-shaped yokes, a beam connecting the crotches of said yokes, an electrode carried by said beam, an electrode actuating means for a co-acting electrode, a pair of spaced members paralleling said beam, and each member engaging the inside of a leg of each of said yokes, and a brace disposed between said members, said brace forming part of said electrode actuating means.

3. In an electric welder, a pair of superposed spaced apart yokes, a transformer carried between said yokes, members connecting said yoke and extending below the same, electrodes carried by said extensions, trunnions affixed to said members below said transformer, and an overhead carrying means pivoted to said trunnions.

4. In a welder, a pair of vertically extending supported members, a block spacing said members, a bracket extending outwardly from said members, a pair of shafts mounted in said bracket, one of said shafts comprising two parts, an electrode carried by one part, said part keyed to said block, a gear wheel carried by the other part, a pinion carried by the other shaft permanently enmeshed with said gear, a hand-wheel carried by said other shaft, whereby the actuation of said hand-wheel reciprocates said electrode without rotating the same.

5. In a welder, a supported block, a layer of insulating material facing said block, an electric conductor abutting said layer, a front block having a recess therein bolted to said supported block and electrically connected to said conductor, an electrode having a stud projecting into said recess, and a binding screw carried by said front block maintaining said electrode removably in place.

6. In a tool of the class described, a pair of spaced electrodes movable relative to each other and connected with a suitable source of electric energy, said electrodes provided with broad surfaces facing each other, a manually-operated supplementary friction-supported electrode of relatively less contact area than said other electrodes adapted to be inserted between one of said electrodes and the work.

7. In a welder, a frame comprising a plurality of vertically spaced Y-shaped yokes, a vertical member connecting the stems of said yokes and extending therebelow, reinforcing members secured thereto, a plurality of vertical members connecting the branches of said yokes, extending therebelow and paralleling the first mentioned member, means connecting said branch-connecting members, a transformer mounted between said yokes, and leads terminating in welding electrodes connected with but insulated from said vertical members.

8. In a welder, a frame comprising a plurality of spaced Y-shaped yokes, a member connecting the stems of said yokes and extending beyond said yokes, a plurality of members paralleling said stem-connecting member and connecting the branches of said yokes, a transformer positioned between said yokes, retaining members therefor on opposite sides thereof secured to said frame, and leads from said transformer terminating in welding electrodes and connected with said members which connect the yokes.

9. In a welder, a frame comprising a pair of spaced yokes, a plurality of rigid members connecting said yokes and extending therebeyond, a transformer positioned between said yokes, leads therefrom guided by extensions of said rigid members connecting the yokes, electrodes carried by said leads, and adjusting means carried by some of said rigid members adapted to move one of said leads.

10. In a welder, a frame comprising vertically spaced yokes, vertical members connecting opposite ends of said yokes extending therebelow and supporting electrodes, a transformer positioned between said yokes having leads to said electrodes, trunnions secured to said vertical members depending from opposite ends of said yoke at points slightly above the center of gravity thereof, and a movable over-head bracket supporting said trunnions.

11. In combination, yokes, means for connecting said yokes, said means having extensions projecting beyond the yokes at one side, a transformer held between the yokes, electrodes extending in proximity to said extensions and means carried by one of the extensions adapted to move one electrode independently of the other electrode.

12. In a welder, a frame comprising a plurality of spaced yokes, rigid members connecting said yokes, a transformer secured in position between the yokes, leads extending from the transformer and terminating in welding electrodes, and means carried by one of said rigid members adapted to move a terminal portion of one of said leads independently of another lead.

13. In a welder, a pair of spaced yokes, rigid members connecting and spacing said yokes, the said rigid members forming extensions of the yokes, a transformer secured between the yokes and rigid connecting members, secondary leads connected with said extensions, welding terminals coöperating with said leads and means carried by said extensions adapted to flex one of said leads.

14. In a welder, a frame comprising a plurality of spaced yokes having stems and branches, a plurality of members connecting the stems and branches of said yokes and forming relatively rigid extensions therefrom, a transformer positioned between said yokes, leads from said transformer, one of which leads is flexible and each lead terminating in a welding electrode, and means carried by one of said extensions adapted to move said flexible lead.

In witness whereof I have hereunto set my hand in the presence of two witnesses.

JOSEPH A. OSBORN.

Witnesses:
YVONNE H. DU GUAY,
GEO. W. BROWN.